United States Patent
Lichter et al.

(10) Patent No.: US 12,493,467 B1
(45) Date of Patent: Dec. 9, 2025

(54) CONTROL REGISTER FOR STORING INSTRUCTION SIZE INFORMATION

(71) Applicant: Apple Inc., Cupertino, CA (US)

(72) Inventors: Omer Lichter, Tel Aviv (IL); Alon Yaakov, Raanana (IL); Nadav Malki, Ashod (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/734,464

(22) Filed: Jun. 5, 2024

(51) Int. Cl.
*G06F 9/30* (2018.01)
*G06F 9/48* (2006.01)

(52) U.S. Cl.
CPC ...... *G06F 9/30123* (2013.01); *G06F 9/30069* (2013.01); *G06F 9/4812* (2013.01)

(58) Field of Classification Search
None
See application file for complete search history.

(56) References Cited

U.S. PATENT DOCUMENTS

| | | | |
|---|---|---|---|
| 9,766,925 B2 | 9/2017 | Greiner et al. | |
| 10,949,249 B2 | 3/2021 | Maruyama | |
| 11,106,463 B2 * | 8/2021 | Anderson | G06F 9/30123 |
| 11,275,590 B2 | 3/2022 | Vincent et al. | |
| 11,544,214 B2 | 1/2023 | Moudgill et al. | |
| 11,829,790 B2 | 11/2023 | Raisch et al. | |
| 11,907,721 B2 | 2/2024 | Bhardwaj et al. | |
| 2004/0123083 A1 * | 6/2004 | Zahir | G06F 9/3861 |
| | | | 712/E9.05 |
| 2008/0115138 A1 * | 5/2008 | Nachimuthu | G06F 9/4812 |
| | | | 718/102 |
| 2016/0293274 A1 * | 10/2016 | Schuh | G11C 29/16 |
| 2024/0330036 A1 * | 10/2024 | Harboe | G06F 9/4812 |

FOREIGN PATENT DOCUMENTS

| | | |
|---|---|---|
| CN | 112631510 B | 5/2023 |
| CN | 115167325 B | 12/2023 |
| JP | 2004259109 A | 9/2004 |
| JP | 2005078131 A | 3/2005 |

* cited by examiner

*Primary Examiner* — Michael Sun
(74) *Attorney, Agent, or Firm* — DICKINSON WRIGHT RLLP

(57) ABSTRACT

A processor circuit that includes a plurality of register circuits and an event handler circuit is disclosed. The event handler circuit may detect a processing event that causes the processor circuit to halt execution of a current instruction and transfer control to a kernel. In response to a detection of the processing event, the event handler circuit may store a program counter value corresponding to the current instruction, information indicative of a cause of the processing event, and a size of the current instruction in corresponding register circuits of the plurality of register circuits.

20 Claims, 8 Drawing Sheets

CONTROL REGISTER FOR STORING INSTRUCTION SIZE INFORMATION

FIELD

The described embodiments relate generally to computer system and, more particularly, to the handling of processing events involving different size instructions.

BACKGROUND

Modern computer systems may include multiple circuit blocks designed to perform various functions. For example, such circuit blocks may include processors or processor cores configured to execute software or program instructions. Additionally, the circuit blocks may include memory circuits, mixed-signal circuits, analog circuits, and the like.

In some computer systems, memory circuits may be used to store instructions included in a software program or application. Processors or processor cores may retrieve such instructions from associated memory circuits in order to execute the instructions. Instructions may be retrieved by a processor or processor core according to how the instructions are arranged in the software program or application. In some computer systems, the instructions stored in the memory circuits may be different sizes. For example, some instructions may be encoded using 32-bits while other instructions may be encoded using 64-bits.

DETAILED DESCRIPTION

Figure 1:
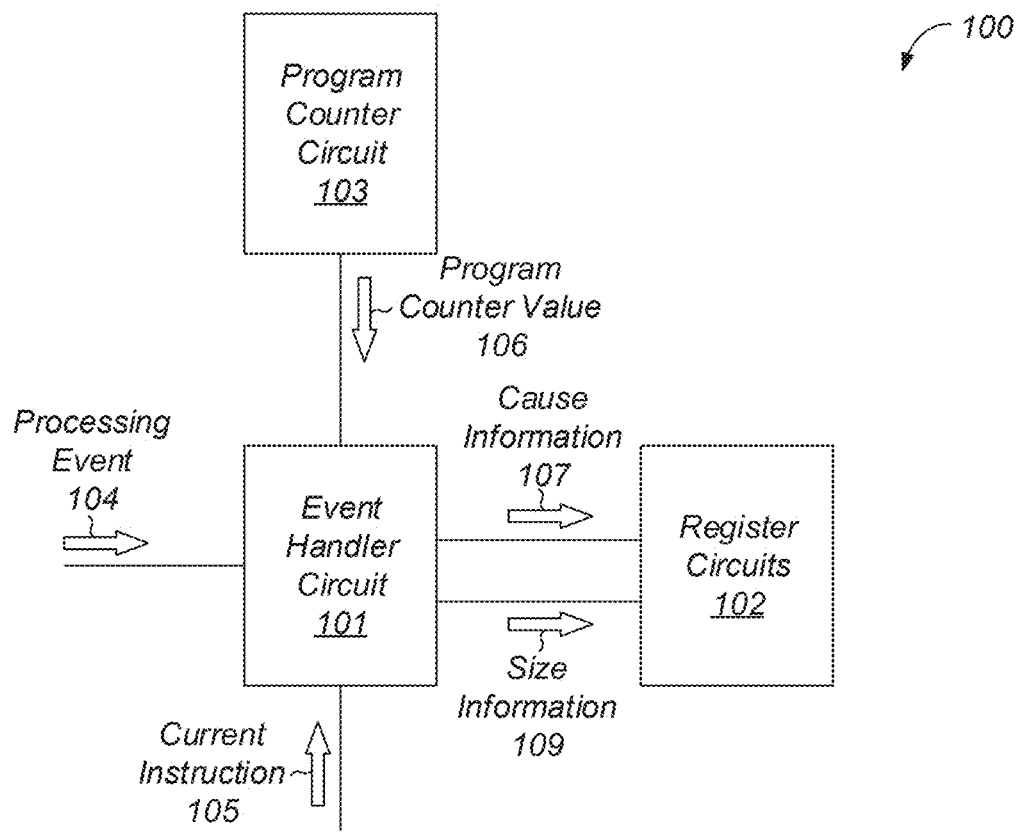
FIG. 1 is a block diagram depicting an embodiment of a processor circuit.

To execute a software program or application, a processor circuit fetches instructions in program order from a memory circuit that is storing the software program or application. In general, program order refers to the sequential order in which instructions appear in the software program or application. Conditional instructions can cause a jump to a different portion of the program (referred to as a "branch"). When a new branch is encountered, the processor circuit continues to fetch instructions in a sequential fashion within the branch until a new branch is detected, or a return to a previous branch or the main program line is indicated.

Once an instruction has been fetched from the memory circuit, it can be executed. In some cases, the processor circuit may execute instructions in an order in which they were fetched. When instructions are executed in this fashion, the structure of the software program or application can result in hardware resources within the processor circuit (e.g., execution circuits) being underutilized, causing inefficient execution of the software program or application.

During execution of an instruction, a processor circuit may detect a processing event. As used herein, a processing event is a situation that causes the processor circuit to transfer control to a kernel or operating system in order to handle the situation. Processing events can include a variety of events such as interrupts and exceptions. An interrupt is a request, from either a hardware device or software, for a processor circuit to stop executing code to allow the kernel or operating system to perform certain functions, while an exception is a type of interrupt generated by a processor circuit when an error, e.g., a page fault, occurs.

Some processor circuits support instructions of different sizes. As used herein, a size of an instruction refers to a number of bits used to encode the instruction. For example, some processor circuits support instructions encoded with 32-bits as well as instructions encoded with 64-bits.

In some processor circuits, when a processing event is encountered, the processor does provide information regarding a violating or interrupted instruction. As part of the handling of the processing event, the processor may eventually return to the interrupted context at an instruction following the violating or interrupted instruction. It is, therefore, important to extract the information regarding the size of the violating instruction so that the instruction may be skipped. In some processor circuits, however, the instruction data stored in memory may be executable-only and non-readable preventing a determination of the size of the violating instruction.

The embodiments illustrated in the drawings and described below may provide techniques for a processor circuit to store size information of a violating instruction during the handling of a processing event. By storing such size information, a processor circuit can use the size information to increment the program counter to fetch a successor instruction, thereby allowing the violating instruction to be skipped.

A block diagram of a processor circuit is depicted in FIG. 1. As illustrated, processor circuit 100 includes event handler circuit 101, register circuits 102, and program counter circuit 103.

Program counter circuit 103 is configured to generate program counter value 106. In various embodiments, program counter value 106 may be used to fetch current instruction 105 from a memory circuit (not shown).

Event handler circuit 101 is configured to detect processing event 104. In various embodiments, processing event 104 causes processor circuit 100 to transfer control from currently executing software to a kernel or operating system.

In various embodiments, event handler circuit 101 is further configured, in response to a detection of processing event 104, to store program counter value 106 in register circuits 102. As described below, program counter value 106 may be used to fetch a successor instruction to current instruction 105.

Additionally, in response to the detection of processing event 104, event handler circuit 101 is further configured to store cause information 107 in register circuits 102. In various embodiments, cause information 107 may include data indicative of a type of event corresponding to processing event 104. For example, in some cases, cause information 107 may include data indicating that processing event 104 is an exception while, in other cases, cause information 107 may include data indicating that processing event 104 is an interrupt.

In various embodiments, event handler circuit 101 is also configured, in response to the detection of processing event 104, to store size information 109 in register circuits 102. Size information 109 may, in some embodiments, include information indicative of a number of bits used to encode current instruction 105. For example, in some cases, size information 109 may include data indicating that current instruction 105 is encoded using 32-bits while, in other cases, size information 109 may include data indicating that current instruction 105 is encoded using 64-bits.

Figure 2:
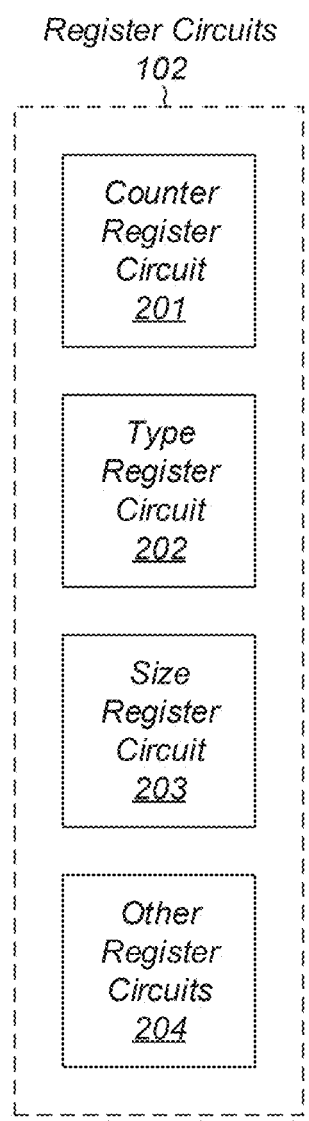
FIG. 2 is a block diagram depicting an embodiment of register circuit for a processor circuit.

Turning to FIG. 2, a block diagram of an embodiment of register circuits 102 is depicted. As illustrated, register circuits 102 includes counter register circuit 201, type register circuit 202, size register circuit 203, and other register circuits 204.

Counter register circuit 201 is configured to store program counter value 106 in response to an activation of a corresponding control signal generated by event handler circuit 101. In some embodiments, counter register circuit 201 may be configured to store a single program counter circuit value while, in other embodiments, counter register circuit 201 may be configured to store any suitable number of program counter circuit values.

Type register circuit 202 is configured to store cause information 107 in response to an activation of a corresponding control signal generated by event handler circuit 101. In various embodiments, cause information 107 may include multiple bits whose collective value corresponds to a cause of processing event 104. For example, in some cases, type register circuit 202 may store a value indicating that processing event 104 is an interrupt. In some embodiments, type register circuit 202 may be configured to store an encoded version of cause information 107.

Size register circuit 203 is configured to store size information 109 in response to an activation of a corresponding control signal generated by event handler circuit 101. In various embodiments, size register circuit 203 may store an uncompressed version of size information 109 while, in other embodiments, size register circuit 203 may be configured to store a compressed version of size information 109.

Other register circuits 204 may include multiple control/status registers (referred to as "CSRs") configured to store data indicative of state information, control information, or any other suitable information for processor circuit 100. In various embodiments, different ones of other register circuits 204 may be configured to store different numbers of bits depending on the nature of the information to be stored.

In various embodiments, counter register circuit 201, type register circuit 202, size register circuit 203, and other register circuits 204 may include one or more storage circuits. For example, in some embodiments, counter register circuit 201, type register circuit 202, size register circuit 203, and other register circuits 204 may include one or more latch circuits, flip-flop circuits, or any other suitable storage circuits.

Although four register circuits are depicted in the embodiment of FIG. 2, in other embodiments, any suitable number of register circuits may be employed. It is noted that although counter register circuit 201, type register circuit 202, size register circuit 203, and other register circuits 204 are depicted as being included in a single block, in various embodiments, any of the register circuits included in register circuits 102 may be physically located in various locations within processor circuit 100.

Figure 3:
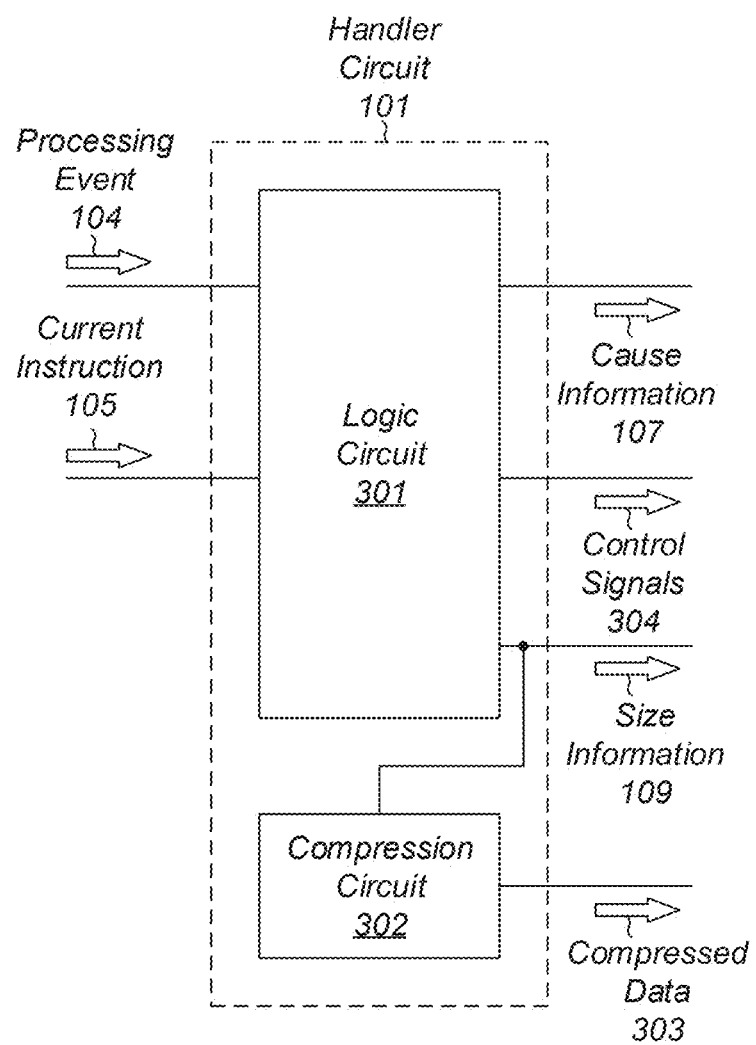
FIG. 3 is a block diagram depicting an embodiment of an event handler circuit.

Turning to FIG. 3, a block diagram of an embodiment of event handler circuit 101 is depicted. As illustrated, event handler circuit 101 includes logic circuit 301 and compression circuit 302.

Logic circuit 301 is configured to generate control signals 304 based on processing event 104 and current instruction 105. In various embodiments, control signals 304 may include signals for storing program counter value 106, cause information 107, and size information 109 into register circuits 102. In some embodiments, logic circuit 301 may be further configured to generate cause information 107 and size information 109 based on processing event 104 and current instruction 105. In other embodiments, logic circuit 301 may be configured to relay program counter value 106 to counter register circuit 201 included in register circuits 102.

Compression circuit 302 is configured to generate compressed data 303 using size information 109. To generate compressed data 303, compression circuit 302 may be configured to set compressed data 303 to a particular value in response to a determination that current instruction 105 is a particular size, and set compressed data 303 to a different value in response to a determination that current instruction 105 is a different size. Although compression circuit 302 is described as generating different values for compressed data 303 for two different sizes of current instruction 105, in other embodiments, compression circuit 302 may be configured to generate compressed data 303 for any suitable number of instruction sizes.

In some embodiments, logic circuit 301 may be implemented using any suitable combination of combinatorial logic circuits. Logic circuit 301 may, in some cases, include one or more state machines or other sequential logic circuits. In various embodiments, compression circuit 302 may be implemented using any suitable combination of sequential and combinatorial logic circuits.

Figure 4:
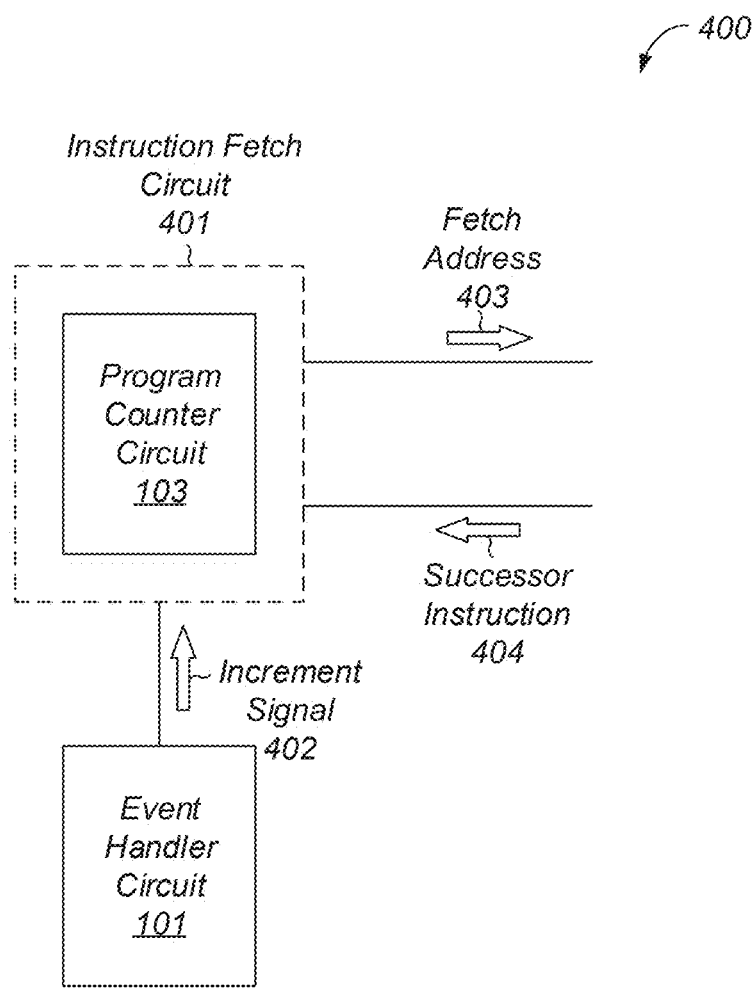
FIG. 4 is a block diagram depicting a different embodiment of a processor circuit.

Turning to FIG. 4, a block diagram of another embodiment of a processor circuit is depicted. As illustrated, processor circuit 400 includes instruction fetch circuit 401 and event handler circuit 101. In various embodiments, instruction fetch circuit 401 includes program counter circuit 103. It is noted that processor circuit 400 may include any of the features described above in regard to processor circuit 100.

Event handler circuit 101 is configured to generate increment signal 402 based on processing event 104. In some embodiments, increment signal 402 may be generated based on a type, e.g., exception, interrupt, etc., associated with processing event 104. Event handler circuit 101 may be configured to generate increment signal 402 in response to a determination that processor circuit 400 should skip current instruction 105 in response to a detection of processing event 104.

Program counter circuit 103 is configured to increment program counter value 106 in response to an activation of increment signal 402. In various embodiments, program counter circuit 103 is configured to increment program counter value 106 based on the contents of size register circuit 203, i.e., based on the number of bits used to encode current instruction 105.

Instruction fetch circuit 401 is configured to generate fetch address 403 using an incremented version of program counter value 106. In various embodiments, instruction fetch circuit 401 is further configured to send fetch address 403 to a memory circuit to fetch successor instruction 404. Upon receiving successor instruction 404 from the memory circuit, processor circuit 400 may be configured to execute successor instruction 404.

To summarize, various embodiments of a processor circuit are disclosed. Broadly speaking, a processor circuit may include a plurality of register circuits and an event handler circuit that may be configured to detect a processing event that causes the processing circuit to halt execution of a current instruction and transfer control to a kernel. The event handler circuit may be further configured, in response to a detection of the processing event, to store a program counter value corresponding to the current instruction in a counter register circuit of the plurality of register circuits. The event handler circuit may be further configured, in response to the detection of the processing event, to store information indicative of a cause of the processing event in a type register circuit of the plurality of register circuits, and to store a size of the current instruction in a size register circuit of the plurality of register circuits.

Figure 5:
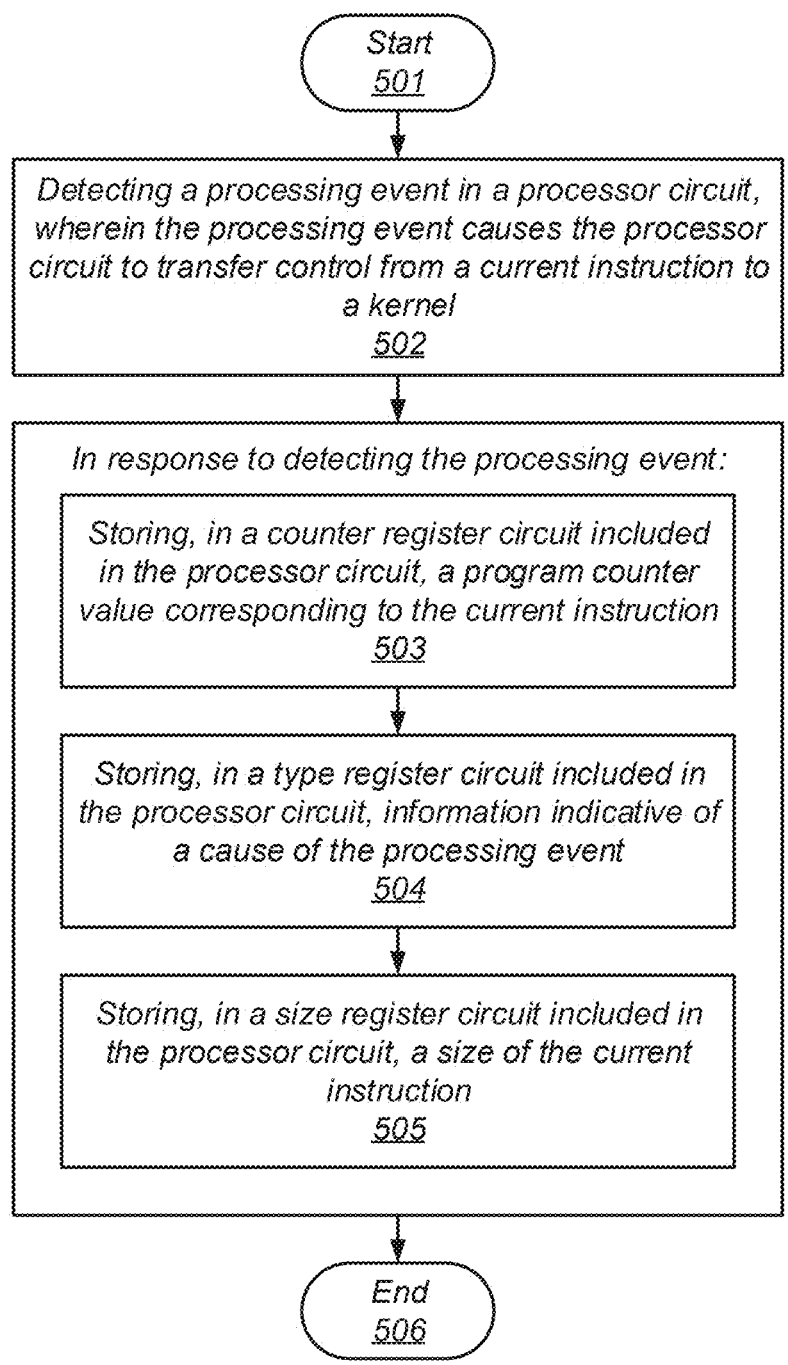
FIG. 5 is a flow diagram depicting an embodiment of a method for operating a processor circuit.

Turning to FIG. 5, a flow diagram depicting an embodiment of a method for operating a processor circuit is illustrated. The method, which may be applied to various processor circuits, e.g., processor circuit 100 as depicted in FIG. 1, begins in block 501.

The method includes detecting a processing event in a processor circuit (block 502). In various embodiments, the processing event may cause the processor circuit to transfer control from a current instruction to a kernel. In some embodiments, the processing event may include an exception while, in other embodiments, the processing event may include an interrupt. It is noted that although only two types of processing events are described, in other embodiments, the embodiment of the method depicted in the flow diagram of FIG. 5 may be employed to any suitable type of processing event.

The method may further include, in response to detecting the processing event, storing, in a counter register circuit included in the processor circuit, a program counter value corresponding to the current instruction (block 503). In some embodiments, storing the program counter value may include retrieving, by an event handler circuit, the program counter value from a program counter circuit, and storing, by the event handler circuit, the program counter value in the counter register circuit.

The method may also include, in response to detecting the processing event, storing, in a type register circuit included in the processor circuit, information indicative of a cause of the processing event (block 504). For example, in some embodiments, a particular value may be stored in the type register circuit in response to determining the processing event is an exception while, in other embodiments, a different value may be stored in the type register circuit in response to determining the processing event is an interrupt.

The method may further include, in response to detecting the processing event, storing, in a size register circuit included in the processor circuit, a size of the current instruction (block 505). In some embodiments, storing the size of the current instruction may include compressing data indicative of the size of the current instruction to generate compressed data. The method may additionally include storing the compressed data in the size register circuit.

In various embodiments, the method may further include skipping, by software executing on the processor circuit, the current instruction using contents of the size register circuit. In some cases, the current instruction may be skipped once the kernel or operating system performs one or more operations associated with the processing event, such as servicing an interrupt.

In some embodiments, skipping the current instruction may include incrementing the program counter value using the contents of the size register circuit to determine a fetch address for a successor instruction. In various embodiments, the method may include fetching the successor instruction using an incremented version of the program counter value, and executing the successor instruction once it has been fetched. The method concludes in block 506.

Figure 6:
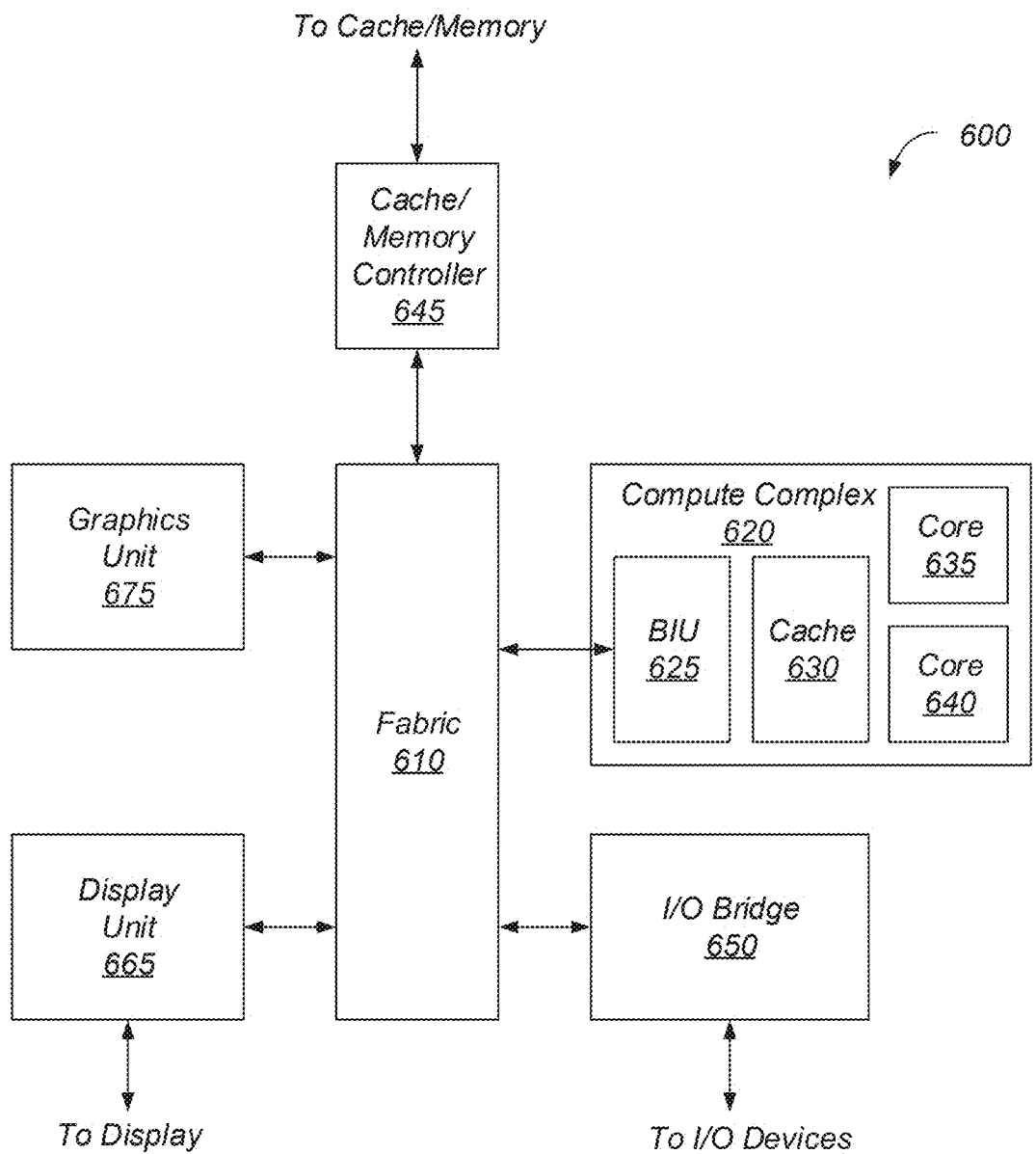
FIG. 6 is a block diagram of an embodiment of a device that includes jitter sensor circuits.

Referring now to FIG. 6, a block diagram illustrating an example embodiment of a device is shown. In various embodiments, device 600 may implement functionality of processor circuit 100 as depicted in FIG. 1. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 675, and display unit 665. In some embodiments, device 600 may include other components (not shown) in addition to, or in place of, the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol, and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores, and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600, may be configured to maintain coherency between various caches of device 600. BIU 625 may be configured to manage communication between compute complex 620 and other elements of device 600. Processor cores, such as cores 635 and 640, may be configured to execute instructions of a particular instruction set architecture (ISA) which may include operating system instructions and user application instructions. These instructions may be stored in a computer readable medium such as a memory coupled to cache/memory controller 645 as discussed below.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Cache/memory controller 645 may be configured to manage transfer of data between fabric 610 and one or more caches and memories. For example, cache/memory controller 645 may be coupled to an L3 cache, which may, in turn, be coupled to a system memory. In other embodiments, cache/memory controller 645 may be directly coupled to a memory. In some embodiments, cache/memory controller 645 may include one or more internal caches. Memory coupled to cache/memory controller 645 may be any type of volatile memory, such as dynamic random access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 620 to cause the computing device to perform functionality described herein.

Graphics unit 675 may include one or more processors, e.g., one or more graphics processing units (GPUs). Graphics unit 675 may receive graphics-oriented instructions, such as OPENGL®, Metal®, or DIRECT3D® instructions, for example. Graphics unit 675 may execute specialized GPU instructions or perform other operations based on the received graphics-oriented instructions. Graphics unit 675 may generally be configured to process large blocks of data in parallel, and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 600 with connectivity to various types of other devices and networks.

Figure 7:
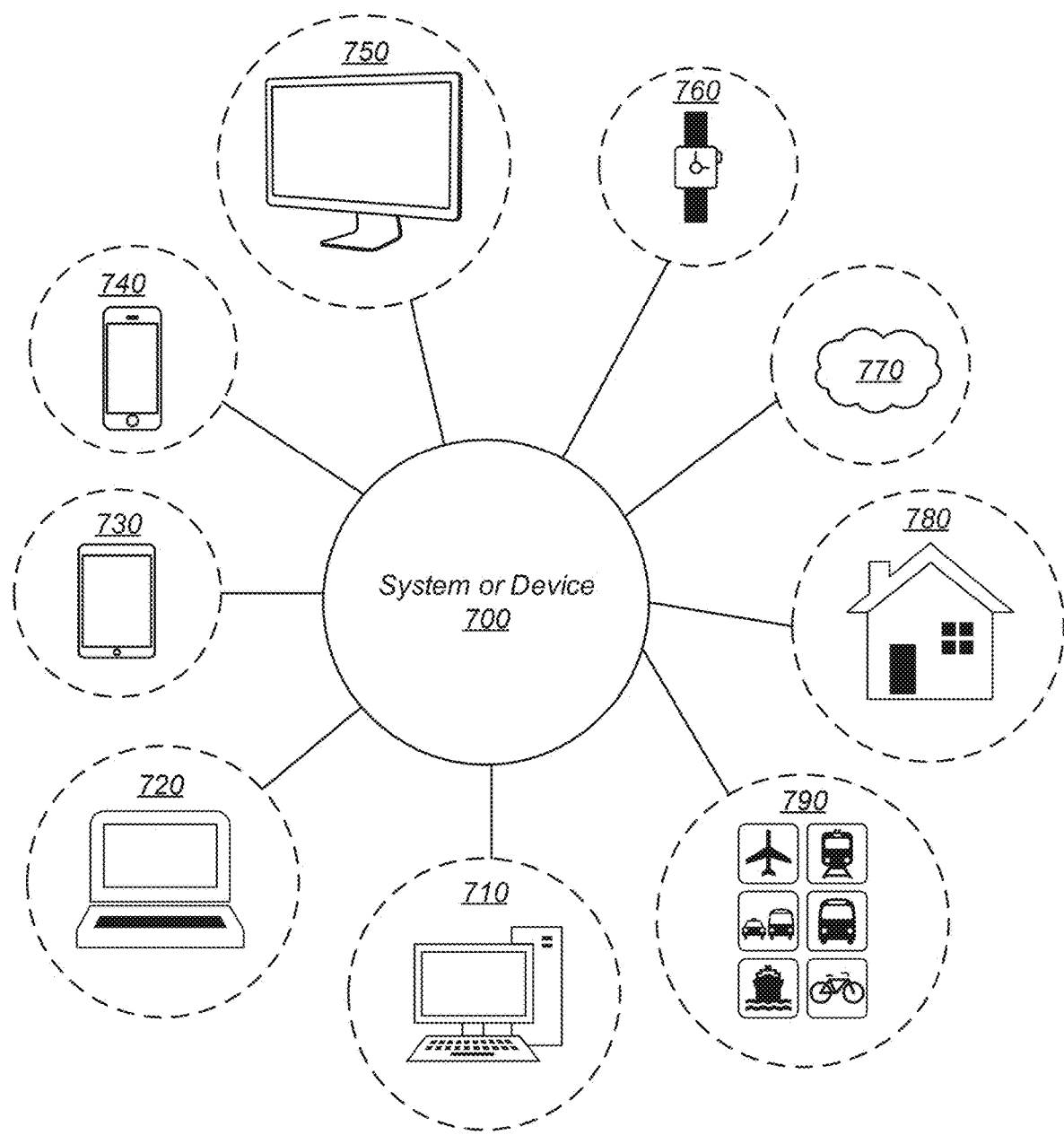
FIG. 7 is a block diagram of various embodiments of computer systems that may include jitter sensor circuits.

Turning now to FIG. 7, various types of systems that may include any of the circuits, devices, or systems discussed above are illustrated. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry.

Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as design simulation, design synthesis, circuit fabrication, etc.

Figure 8:
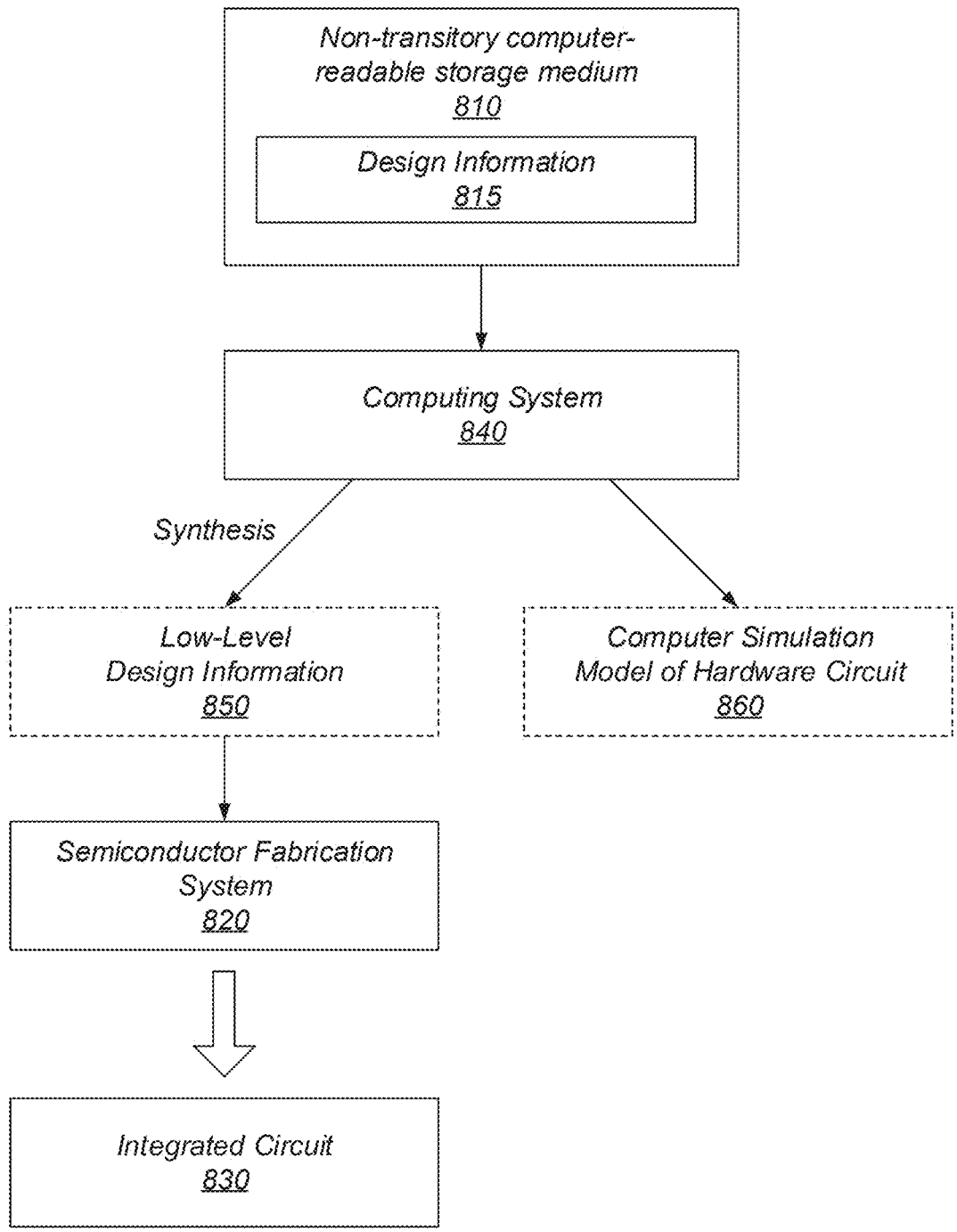
FIG. 8 illustrates an example of a non-transitory computer-readable storage medium that stores circuit design information.

FIG. 8 is a block diagram illustrating an example of a non-transitory computer-readable storage medium that stores design information 815, according to some embodiments. In the illustrated embodiment, computing system 840 is configured to process design information 815. This may include executing instructions included in design information 815, interpreting instructions included in design information 815, compiling, transforming, or otherwise updating design information 815, etc. Therefore, design information 815 controls computing system 840 (e.g., by programming computing system 840) to perform various operations discussed below, in some embodiments.

In the illustrated example, computing system 840 processes design information 815 to generate both computer simulation model of hardware circuit 860 and low-level design information 850. In other embodiments, computing system 840 may generate only one of these outputs, may generate other outputs based on design information 815, or both. Regarding computer simulation model of hardware circuit 860, computing system 840 may execute instructions of a hardware description language that includes register transfer level (RTL) code, behavioral code, structural code, or some combination thereof. The simulation model may perform the functionality specified by design information 815, facilitate verification of the functional correctness of the hardware design, generate power consumption estimates, generate timing estimates, etc.

In the illustrated example, computing system 840 also processes design information 815 to generate low-level design information 850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 850 (potentially among other inputs), semiconductor fabrication system 820 is configured to fabricate integrated circuit 830 (which may correspond to functionality of the computer simulation model of hardware circuit 860). Note that computing system 840 may generate different simulation models based on design information at various levels of description, including low-level design information 850, design information 815, and so on. The data representing low-level design information 850 and computer simulation model of hardware circuit 860 may be stored on non-transitory computer-readable storage medium 810, or on one or more other media.

In some embodiments, low-level design information 850 controls (e.g., programs) semiconductor fabrication system 820 to fabricate integrated circuit 830. Thus, when processed by the fabrication system, the design information may program the fabrication system to fabricate a circuit that includes various circuitry disclosed herein.

Non-transitory computer-readable storage medium 810 may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 810 may include other types of non-transitory memory as well, or combinations thereof. Accordingly, non-transitory computer-readable storage medium 810 may include two or more memory media, which may reside in different locations—for example, in different computer systems that are connected over a network.

Design information 815 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 840, semiconductor fabrication system 820, or both. In some embodiments, design information 815 may also include one or more cell libraries that specify the synthesis, layout, or both of integrated circuit 830. In some embodiments, design information 815 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 and computer simulation model of hardware circuit 860 are configured to operate according to a circuit design specified by design information 815, which may include performing any of the functionality described herein. For example, integrated circuit 830 may include any of various elements shown in FIGS. 1-4. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 815. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 815 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 850. Low-level design information 850 may program semiconductor fabrication system 820 to fabricate integrated circuit 830.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit.

For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a processor circuit including:
a plurality of register circuits; and
an event handler circuit configured to:
detect a processing event that causes the processor circuit to halt execution of a current instruction and transfer control to a kernel;
in response to a detection of the processing event:
store a program counter value corresponding to the current instruction in a counter register circuit of the plurality of register circuits;
store information indicative of a cause of the processing event in a type register circuit of the plurality of register circuits; and
store a size of the current instruction in a size register circuit of the plurality of register circuits.

2. The apparatus of claim 1, wherein to store the size of the current instruction, the event handler circuit is further configured to:
compress data indicative of the size of the current instruction to generate compressed data; and
store the compressed data in the size register circuit.

3. The apparatus of claim 1, wherein the processor circuit is further configured, in response to resolving the processing event, to skip the current instruction using the size of the current instruction stored in the size register circuit.

4. The apparatus of claim 3, wherein to skip the current instruction, the processor circuit is further configured to:
increment the program counter value using the size of the current instruction stored in the size register circuit to determine a fetch address for a successor instruction; and
fetch the successor instruction using the fetch address.

5. The apparatus of claim 1, wherein the processing event includes an exception.

6. The apparatus of claim 1, wherein the processing event includes an interrupt.

7. A method, comprising:
detecting a processing event in a processor circuit, wherein the processing event causes the processor circuit to transfer control from a current instruction to a kernel;
in response to detecting the processing event:
storing, in a counter register circuit included in the processor circuit, a program counter value corresponding to the current instruction;
storing, in a type register circuit included in the processor circuit, information indicative of a cause of the processing event; and storing, in a size register circuit included in the processor circuit, a size of the current instruction.

8. The method of claim 7, wherein storing the size of the current instruction includes:
  compressing data indicative of the size of the current instruction to generate compressed data; and
  storing the compressed data in the size register circuit.

9. The method of claim 8, further comprising skipping, by software executing on the processor circuit, the current instruction using contents of the size register circuit.

10. The method of claim 9, wherein skipping the current instruction includes incrementing the program counter value using the contents of the size register circuit to determine a fetch address for a successor instruction.

11. The method of claim 10, further comprising executing the successor instruction.

12. The method of claim 7, wherein the processing event includes an exception.

13. The method of claim 7, wherein the processing event includes an interrupt.

14. An apparatus, comprising:
  a memory circuit configured to store a plurality of instructions;
  a processor circuit configured to:
    fetch one or more instructions of the plurality of instructions from the memory circuit;
    execute the one or more instructions;
    detect a processing event in the processor circuit;
    in response to a detection of the processing event:
      transfer control to a kernel from a current instruction;
      store a program counter value corresponding to the current instruction;
      store information indicative of a cause of the processing event; and
      store a size of the current instruction.

15. The apparatus of claim 14, wherein to store the size of the current instruction, the processor circuit is further configured to:
  compress data indicative of the size of the current instruction to generate compressed data; and
  store the compressed data in a size register circuit included in the processor circuit.

16. The apparatus of claim 15, wherein the processor circuit is further configured to skip the current instruction using contents of the size register circuit.

17. The apparatus of claim 16, wherein to skip the current instruction, the processor circuit is further configured to increment the program counter value using the contents of the size register circuit to determine a fetch address for a successor instruction.

18. The apparatus of claim 17, wherein the processor circuit is further configured to:
  fetch the successor instruction using the fetch address; and
  execute the successor instruction.

19. The apparatus of claim 14, wherein the processing event includes an exception.

20. The apparatus of claim 14, wherein the processing event includes an interrupt.

* * * * *